(12) United States Patent
Schmidt

(10) Patent No.: US 7,717,436 B1
(45) Date of Patent: May 18, 2010

(54) CONTINUOUSLY ADJUSTABLE COLLET CHUCK

(75) Inventor: Edward J. Schmidt, St. James, NY (US)

(73) Assignee: Curran Manufacturing Corporation, Hauppage, NY (US)

( * ) Notice: Subject to any disclaimer, the term of this patent is extended or adjusted under 35 U.S.C. 154(b) by 0 days.

(21) Appl. No.: 11/955,572

(22) Filed: Dec. 13, 2007

Related U.S. Application Data

(60) Provisional application No. 60/870,248, filed on Dec. 15, 2006.

(51) Int. Cl.
*B23B 31/20* (2006.01)

(52) U.S. Cl. .......................... 279/43.4; 279/51

(58) Field of Classification Search ................ 279/43.2, 279/43.4, 43.1, 46.3, 51; B23B 31/20
See application file for complete search history.

(56) References Cited

U.S. PATENT DOCUMENTS

| | | | | |
|---|---|---|---|---|
| 2,529,218 A | * | 11/1950 | Hunsdorf | ...................... 279/48 |
| 2,733,925 A | * | 2/1956 | Denzler | ........................ 279/43 |
| 3,762,731 A | * | 10/1973 | Matsumoto | .................. 279/51 |
| 4,856,797 A | * | 8/1989 | Rall | ........................... 279/46.7 |
| 4,971,340 A | * | 11/1990 | Rall | ............................. 279/57 |
| 5,961,259 A | * | 10/1999 | Ziegler | ....................... 408/181 |
| 6,290,241 B1 | * | 9/2001 | Fink et al. | ..................... 279/50 |

OTHER PUBLICATIONS

Figure of adjustable collect and explanation.

* cited by examiner

*Primary Examiner*—Eric A Gates
(74) *Attorney, Agent, or Firm*—Fish & Richardson P.C.

(57) ABSTRACT

A continuously adjustable collet chuck assembly comprising: a) a collet chuck body, b) an adjustment ring positioned within the collet chuck body, the adjustment ring including fixed key sized and configured to engage a keyway on a collet, and c) a locking member positioned in the collet chuck body to exert a force on the ring, the force having a substantial component in the axial direction to prevent rotation of the ring. The axial force securely fixes the adjustment ring, and therefore the collet, at any rotational position.

9 Claims, 4 Drawing Sheets

CONTINUOUSLY ADJUSTABLE COLLET CHUCK

CROSS-REFERENCE TO RELATED APPLICATIONS

This application claims priority to U.S. Application Ser. No. 60/870,248, filed on Dec. 15, 2006.

TECHNICAL FIELD

This invention is in the general field of collet chucks used to hold a work piece, e.g. so the work piece can be machined; the invention particularly relates to collet adjustment in collet chucks.

BACKGROUND

A collet (or collet chuck) is a holding device that forms a collar around, and exerts a force on, a work piece (typically a rod-shaped object). A collet assembly often includes collet segments positioned in a collet chuck body, to center and grip the work piece in a lathe. Typically the collet has a slotted clamping sleeve with a conical portion to clamp a work piece by forcing the collet segments radially in or radially out. The collet fits into a collet chuck which is attached to the face of the spindle or a work surface. One advantage of collets is the precision with which they hold the work piece due to their fixed dimensions.

Collet chucks are known in which a locking screw provides rotational adjustment in discrete increments, for example, by rotating the collet to one or more discrete, regularly spaced stops positioned around the collet chucks circumference. The adjustments are possible in discrete increments due to a key, e.g., a dog point screw, which engages the collet keyway. By relying on discrete stops, such collets are limited to discrete stop positions. Once the rotational position has been fixed relative to a locking screw, it is typically necessary to further rotate the collet in one direction or the other, to tighten it or back it out. Since adjustment is limited to discrete positions around the circumference of the collet chuck body, it is not possible to control the rotational position of the collet.

SUMMARY

In its most general form, the invention features a continuously adjustable collet chuck assembly comprising: a) a collet chuck body, b) an adjustment ring positioned within the collet chuck body, the adjustment ring including fixed key sized and configured to engage a keyway on a collet and c) a locking member positioned in the collet chuck body to exert a force on the ring, the force having a substantial component in the axial direction to prevent rotation of the ring. The axial force securely fixes the adjustment ring, and therefore the collet, at any rotational position.

In preferred embodiments, the locking member exerts a force having at least some radial component, said component in the axial direction being at least 15% of the radial component.

The invention may be used with collet chuck assemblies that includes a sleeve positioned in the collet chuck body and surrounding the collet (so called fixed length collet chuck assemblies), as well as with draw back type collet chuck assemblies.

Preferably the locking member mates with a feature such as a chamfer on the adjustment ring that transmits force to the adjustment ring with at least some axial component. The locking member may include a threaded member exerting force radially and a segment such as a surface (e.g., a conical or frusto-conical surface) that is slanted with respect to the radial direction, so as to translate at least some of the radial force axially.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
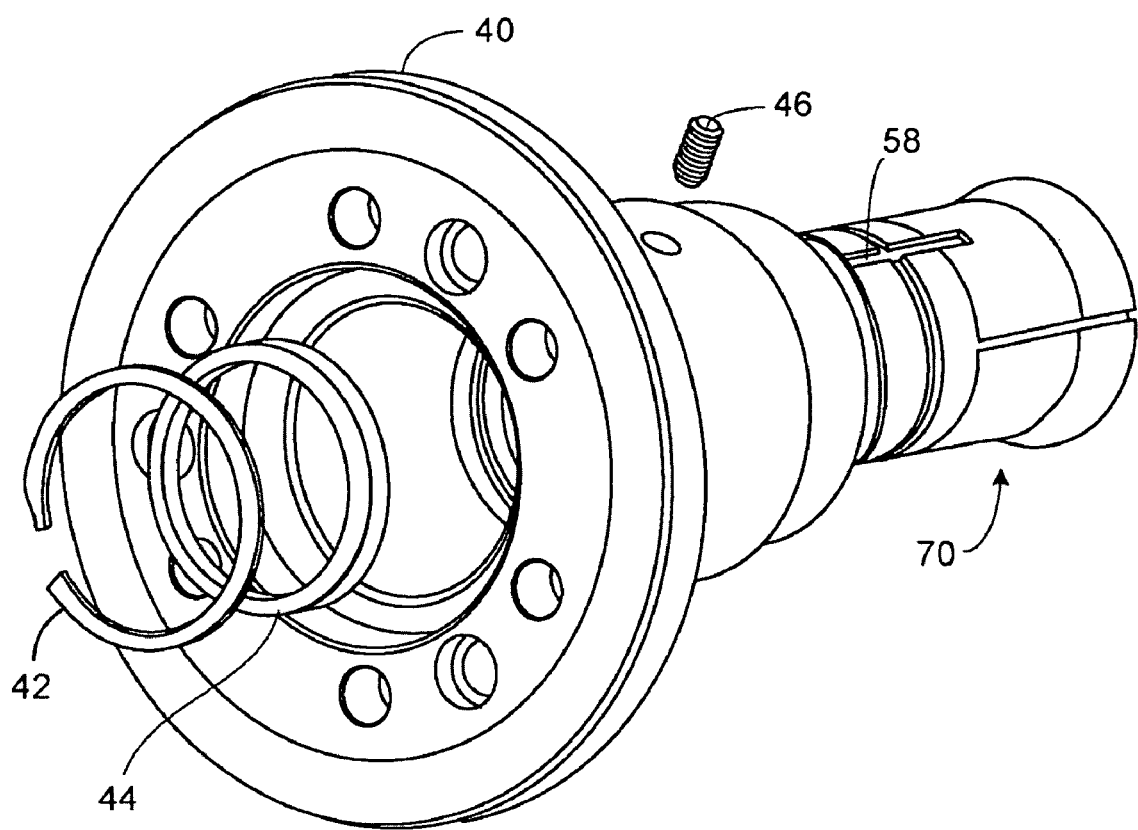
FIG. 1 is a perspective view of a collet chuck assembly according to the invention together with a collet.
Figure 2:
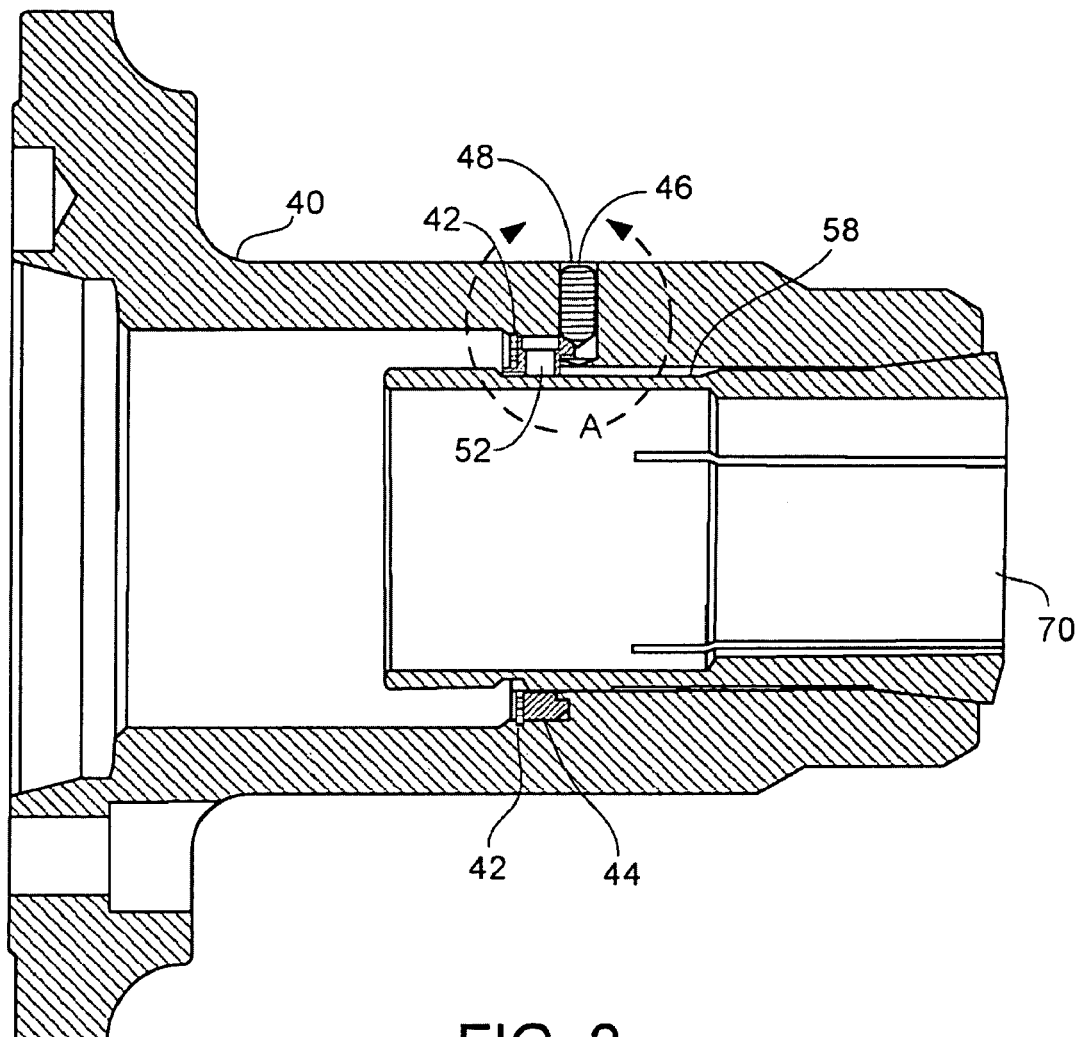
FIG. 2 is a sectional view of a collet chuck assembly according to the invention together with a collet.
Figure 3:
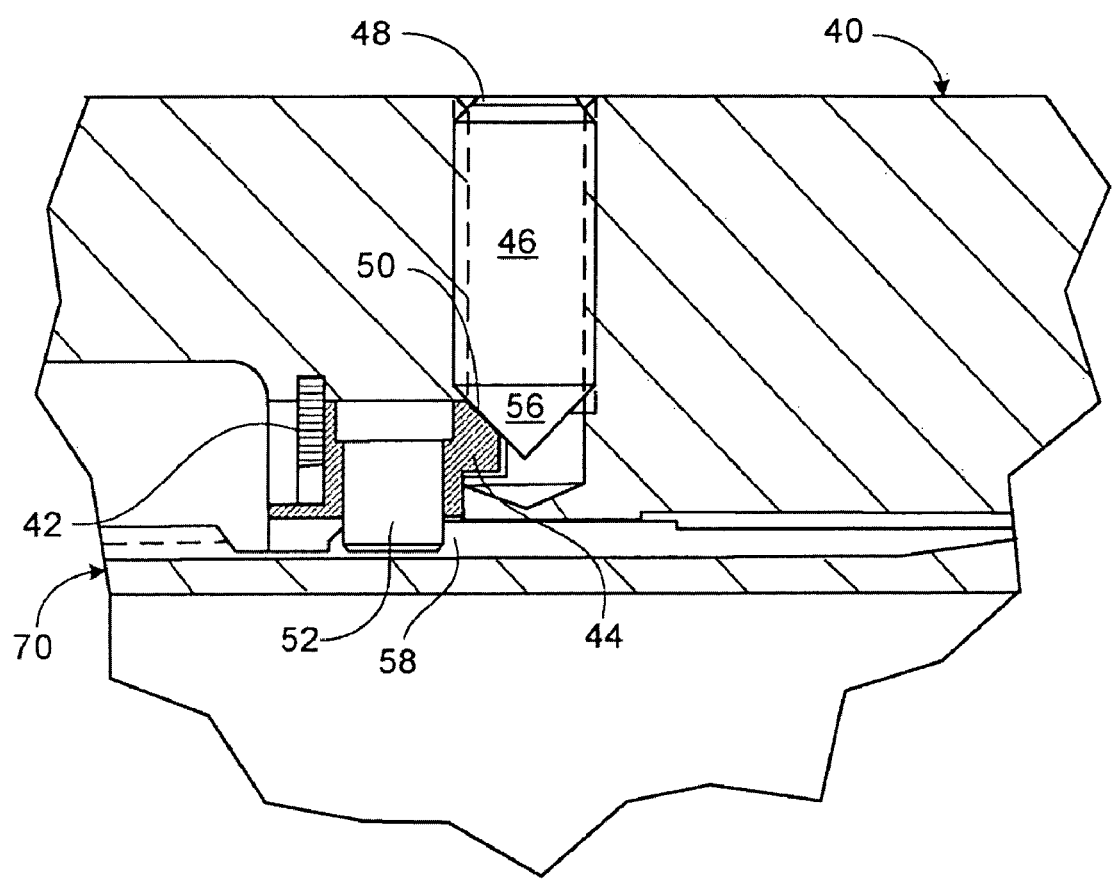
FIG. 3 is an enlarged sectional view of region "A" in FIG. 2, showing the interaction of the adjustment ring with the locking member.
Figure 4:
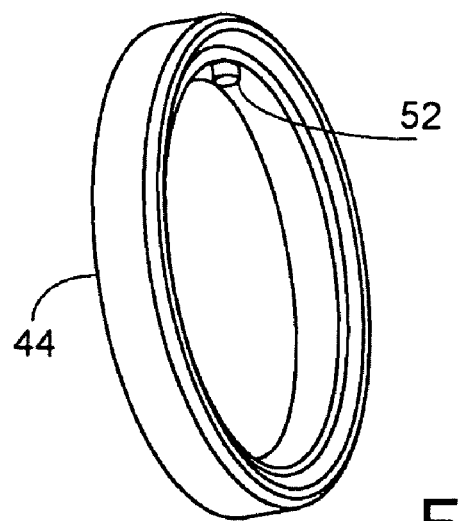
FIG. 4 is a perspective view of an adjustment ring.

FIGS. 1-3 depict a draw back type collet chuck assembly having collet 70 shown outside of body 40 for clarity (FIG. 1). Retaining ring 42 and an adjustment ring 44 are positioned within body 40. As best shown in FIGS. 2 and 3, a cone point set screw 46 is threaded through threaded opening 48 positioned so that the slanted surface 56 of locking screw 46 engages a chamfer 50 on the rearward surface of ring 44. Ring 44 (shown separately in FIG. 4) also includes a key 52 which extends radially inward to engage keyway 58 of collet 70. Keyway 58 extends axially along the exterior of collet 70, to key the collet to ring 44. As best shown in FIG. 3, the slanted surface 56 of locking screw 46 engages a chamfered surface 50 on adjustment ring 44. As screw 46 is advanced radially inward, surface 56 imparts an axial force against surface 50 and thus against ring 44, thereby forcing adjustment ring 44 against retaining ring 42.

In this way, locking screw 46 can lock ring 44 in any rotational position without changing the rotational position of the collet 70, and, since ring 44 is fixed via key 52 to collet 70, locking screw prevents rotation of collet 70.

Figure 5:
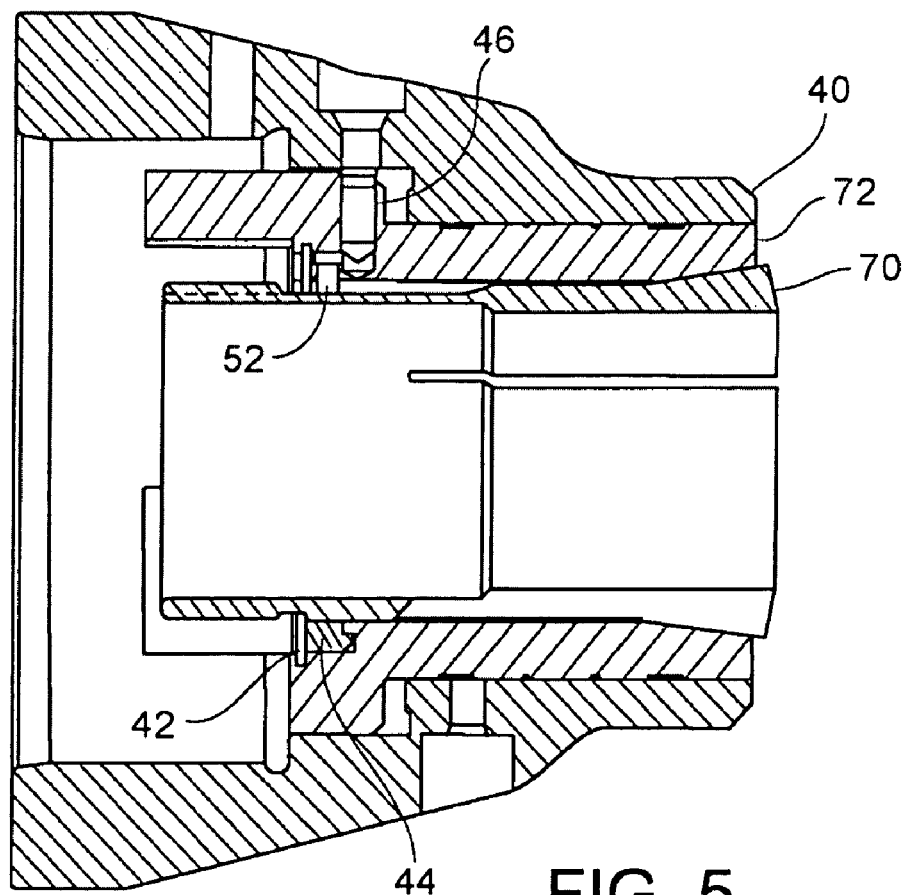
FIG. 5 is a sectional view of an alternative embodiment of a fixed length collet chuck assembly.

FIG. 5 shows an alternative collet chuck, a fixed length collet chuck, having the features of the invention. Chuck body 40 includes a sleeve 72 within outer body 40.

A number of embodiments of the invention have been described. Nevertheless, it will be understood that various modifications may be made without departing from the spirit and scope of the invention. For example, other locking members may be used, with other configurations that impart axial force to the adjustment ring and to the retaining ring. Accordingly, other embodiments are within the scope of the following claims.

What is claimed is:

1. A continuously adjustable collet chuck assembly comprising:
   a) a collet chuck body,
   b) an adjustment ring positioned within the collet chuck body, the adjustment ring including fixed key sized and configured to engage a keyway on a collet, c) a locking member positioned in the collet chuck body to exert a force on the adjustment ring, the force having a substantial component in the axial direction to prevent rotation of the ring; and d) a retaining ring abutting the adjustment ring, whereby axial force on the adjustment ring forces the retaining ring and the adjustment ring together.

2. The assembly of claim 1 in which the locking member exerts a force having at least some radial component, said component in the axial direction being at least 15% of the radial component.

3. The assembly of claim 1 further comprising a sleeve positioned in the collet chuck body and surrounding the collet.

4. The assembly of claim 1 in which the locking member mates with a feature on the adjustment ring that transmits force to the adjustment ring with at least some axial component.

5. The assembly of claim 4 in which the feature is a chamfer on the adjustment ring.

6. The assembly of claim 1 or claim 4 in which the locking member comprises a threaded member exerting force radially.

7. The assembly of claim 6 in which the locking member comprises a segment that translates at least some of the radial force axially.

8. The assembly of claim 7 in which the axial force translating segment comprises a surface that is slanted with respect to the radial direction.

9. The assembly of claim 8 in which the surface is a conical or frusto-conical surface.

* * * * *